US012659687B2

(12) United States Patent
Choi et al.

(10) Patent No.: US 12,659,687 B2
(45) Date of Patent: Jun. 16, 2026

(54) METHOD AND APPARATUS FOR GENERATING LATE REVERBERATION

(71) Applicant: Electronics and Telecommunications Research Institute, Daejeon (KR)

(72) Inventors: Jung-Woo Choi, Daejeon (KR); Jae-Hyoun Yoo, Daejeon (KR); Kyeongok Kang, Daejeon (KR); Soo Young Park, Daejeon (KR); Yong Ju Lee, Daejeon (KR); Dae Young Jang, Daejeon (KR); Young Ho Jeong, Daejeon (KR); Seongrae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 192 days.

(21) Appl. No.: 18/439,910

(22) Filed: Feb. 13, 2024

(65) Prior Publication Data

US 2024/0340609 A1 Oct. 10, 2024

(30) Foreign Application Priority Data

Apr. 10, 2023 (KR) ........................ 10-2023-0046932

(51) Int. Cl.
*H04S 7/00* (2006.01)

(52) U.S. Cl.
CPC .............. *H04S 7/305* (2013.01); *H04S 7/307* (2013.01)

(58) Field of Classification Search
CPC .......... H04S 7/305; G10L 2021/02082; G10K 15/08
See application file for complete search history.

(56) References Cited

U.S. PATENT DOCUMENTS

| | | | | |
|---|---|---|---|---|
| 9,595,266 | B2 | 3/2017 | Beack et al. | |
| 11,190,898 | B2 | 11/2021 | Tang et al. | |
| 11,856,388 | B2 * | 12/2023 | Neukam | H04S 7/305 |
| 2021/0201923 | A1 | 7/2021 | Lee et al. | |

* cited by examiner

*Primary Examiner* — Kile O Blair
(74) *Attorney, Agent, or Firm* — NSIP Law

(57) ABSTRACT

A method and apparatus for generating late reverberation are provided. The method includes generating a reverberation parameter required to generate late reverberation based on an early room impulse response, outputting late reverberation based on the reverberation parameter, and outputting a room impulse response based on the early room impulse response and the late reverberation.

18 Claims, 8 Drawing Sheets

METHOD AND APPARATUS FOR GENERATING LATE REVERBERATION

CROSS-REFERENCE TO RELATED APPLICATION

This application claims the benefit of Korean Patent Application No. 10-2023-0046932 filed on Apr. 10, 2023, in the Korean Intellectual Property Office, the entire disclosure of which is incorporated herein by reference for all purposes.

BACKGROUND

1. Field of the Invention

One or more embodiments relate to a method and apparatus for generating late reverberation.

2. Description of the Related Art

In order to render sound in a virtual reality (VR) environment, a room impulse response, which contains information about how sound waves radiated from a sound source in a virtual room are reflected and scattered by walls and objects in the room, needs to be generated. To generate a realistic room impulse response, various sound modeling technologies are used, such as an image source method, ray tracing, and boundary element method. The more sound waves are reflected in the room, the more complex temporal and spatial characteristics become. Therefore, a very high quantity of operations is required to generate late reverberation in the room impulse response.

On the other hand, in the case of an early room impulse response with a small number of reflections, a relatively small number of image sources is required when using the image source method, and when using the ray tracing, late reverberation may be generated with only a few number of ray tracing operations. Therefore, a relatively low quantity of operations is required.

Considering that in the VR environment, the room impulse response changes every time a user moves in the virtual space wearing a headset or turns their head, a room impulse sound needs to be generated in real time according to the position of the user or an angle change.

SUMMARY

In order to generate a real time room impulse response, technology of generating late reverberation with a low quantity of operations is required.

Embodiments may provide technology of generating late reverberation with a low quantity of operations based on an early room impulse response.

Embodiments may use only an early room impulse response so that a model parameter of a complex room may not be required and may generate late reverberation with a low quantity of operations even for rooms with complex shapes and acoustic characteristics.

Embodiments may realistically simulate time-frequency characteristics and echo density of late reverberation, compared to existing late reverberation generation methods.

However, the technical goals are not limited to the foregoing goals, and there may be other technical goals.

According to an aspect, there is provided a sound processing method including generating a reverberation parameter required to generate late reverberation based on an early room impulse response, outputting late reverberation based on the reverberation parameter, and outputting a room impulse response based on the early room impulse response and the late reverberation.

The generating of the reverberation parameter may include generating the reverberation parameter based on an echo histogram and a spectrogram for the early room impulse response.

The generating of the reverberation parameter based on the echo histogram and the spectrogram may include generating an echo parameter based on the echo histogram and generating a frequency parameter based on the spectrogram, wherein the reverberation parameter may include the echo parameter and the frequency parameter.

The generating of the echo parameter may include generating an echo density feature vector based on the echo histogram and generating the echo parameter based on the echo density feature vector.

The generating of the frequency parameter may include generating a frequency feature vector based on the spectrogram and generating the frequency parameter based on the frequency feature vector.

The echo density feature vector may be an echo density change over time extracted from the echo histogram.

The frequency feature vector may be a frequency change over time extracted from the spectrogram.

The outputting of the late reverberation may include controlling characteristics of the late reverberation based on the echo parameter and the frequency parameter.

The controlling of the characteristics of the late reverberation may include controlling echo density of the late reverberation based on the echo parameter and controlling time-frequency characteristics of the late reverberation based on the frequency parameter.

The outputting of the late reverberation may include generating first noise based on a first echo parameter included in the echo parameter, generating second noise based on a second echo parameter included in the echo parameter, synthesizing the first noise with the second noise for each time frame to convert the first noise and the second noise into a signal in the form of reverberation, modulating a frequency of the signal in the form of reverberation by a sub-band filter based on the frequency parameter, and outputting the signal with the modulated frequency as the late reverberation.

According to another aspect, there is provided a sound processing apparatus including a memory configured to store one or more instructions and a processor configured to execute the instructions, wherein, when the instructions are executed, the processor may be configured to perform a plurality of operations, wherein the plurality of operations may include generating a reverberation parameter required to generate late reverberation based on an early room impulse response, outputting late reverberation based on the reverberation parameter, and outputting a room impulse response based on the early room impulse response and the late reverberation.

The generating of the reverberation parameter may include generating the reverberation parameter based on an echo histogram and a spectrogram for the early room impulse response.

The generating of the reverberation parameter based on the echo histogram and the spectrogram may include generating an echo parameter based on the echo histogram and generating a frequency parameter based on the spectrogram, wherein the reverberation parameter may include the echo parameter and the frequency parameter.

The generating of the echo parameter may include generating an echo density feature vector based on the echo histogram and generating the echo parameter based on the echo density feature vector.

The generating of the frequency parameter may include generating a frequency feature vector based on the spectrogram and generating the frequency parameter based on the frequency feature vector.

The echo density feature vector may be an echo density change over time extracted from the echo histogram.

The frequency feature vector may be a frequency change over time extracted from the spectrogram.

The outputting of the late reverberation may include controlling characteristics of the late reverberation based on the echo parameter and the frequency parameter.

The controlling of the characteristics of the late reverberation may include controlling echo density of the late reverberation based on the echo parameter and controlling time-frequency characteristics of the late reverberation based on the frequency parameter.

The outputting of the late reverberation may include generating first noise based on a first echo parameter included in the echo parameter, generating second noise based on a second echo parameter included in the echo parameter, synthesizing the first noise with the second noise for each time frame to convert the first noise and the second noise into a signal in the form of reverberation, modulating a frequency of the signal in the form of reverberation by a sub-band filter based on the frequency parameter, and outputting the signal with the modulated frequency as the late reverberation.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
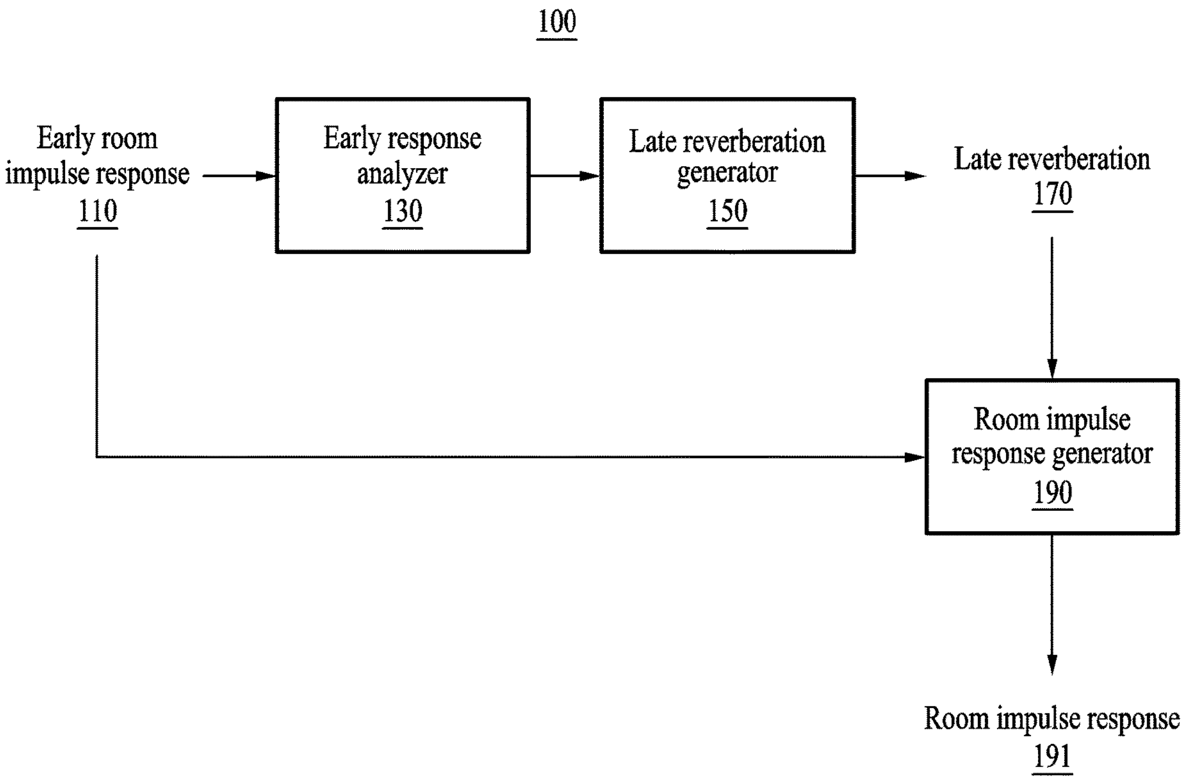
FIG. 1 illustrates an overall configuration of a method of generating late reverberation, according to an embodiment.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 illustrates an overall configuration of a method of generating late reverberation, according to an embodiment.

Referring to FIG. 1, according to an embodiment, a late reverberation generation device 100 may generate late reverberation based on an input. The input may include an early room impulse response 110. For example, the early room impulse response 110 may be generated using a sound modeling method before 80 milliseconds (ms) and then may be input as an input to the late reverberation generation device 100, or the late reverberation generation device 100 may generate the early room impulse response 110 using the sound modeling method. In another example, an early room impulse response of a real room may be used as an input. The late reverberation generation device 100 may include an early response analyzer 130, a late reverberation generator 150, and a room impulse response generator 190.

The early response analyzer 130 may generate a reverberation parameter required to generate late reverberation 170 based on the early room impulse response 110. For example, the early response analyzer 130 may generate the reverberation parameter based on an echo histogram for the early room impulse response 110 and a spectrogram for the early room impulse response 110. The reverberation parameter may include an echo parameter and a frequency parameter. The early response analyzer 130 may output the reverberation parameter to the late reverberation generator 150.

The late reverberation generator 150 may generate the late reverberation 170 based on the reverberation parameter. For example, the late reverberation generator 150 may control the characteristics of the late reverberation 170 based on the echo parameter and the frequency parameter. The late reverberation generator 150 may control echo density of the late reverberation 170 based on the echo parameter. The late reverberation generator 150 may control time-frequency characteristics of the late reverberation 170 based on the frequency parameter. The late reverberation generator 150 may output the late reverberation 170 to the room impulse response generator 190.

The room impulse response generator 190 may generate a room impulse response 191 based on the late reverberation 170 and the early room impulse response 110.

Figure 2:
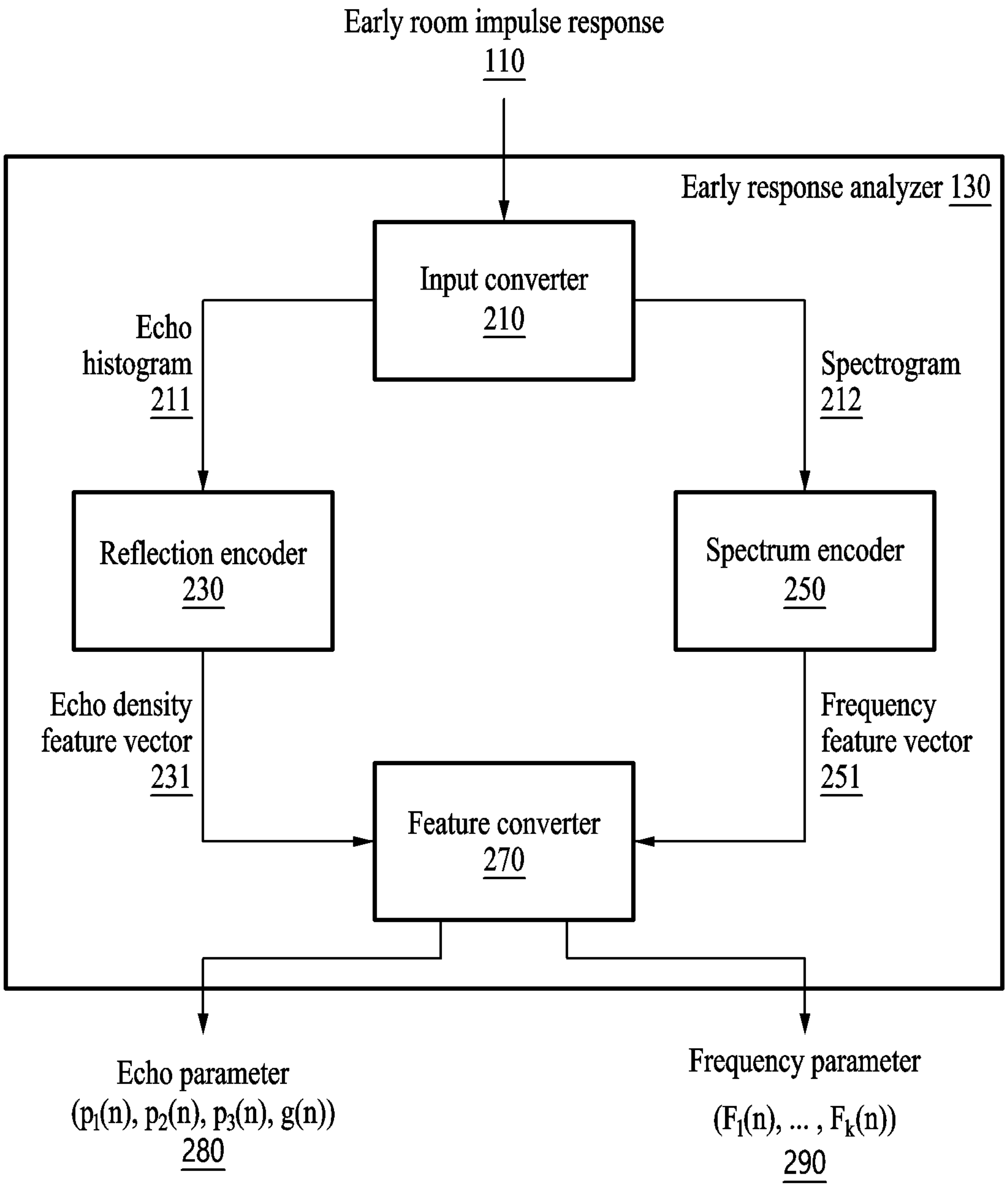
FIG. 2 illustrates an example of an early response analyzer.
Figure 3:
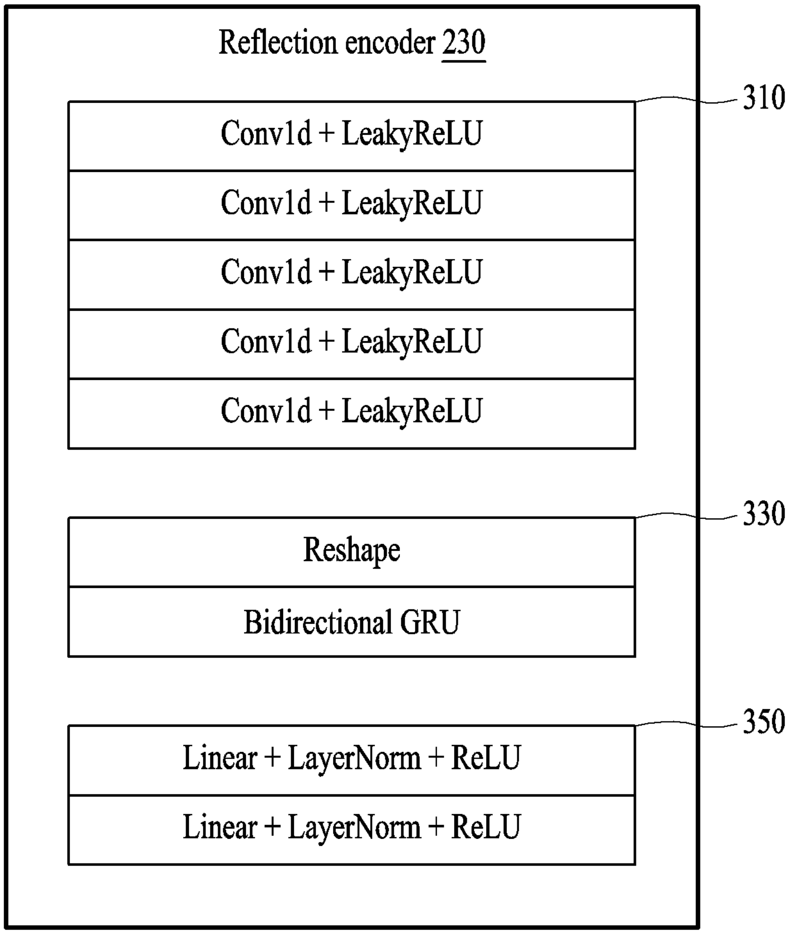
FIG. 3 illustrates an example of a reflection encoder.
Figure 4:
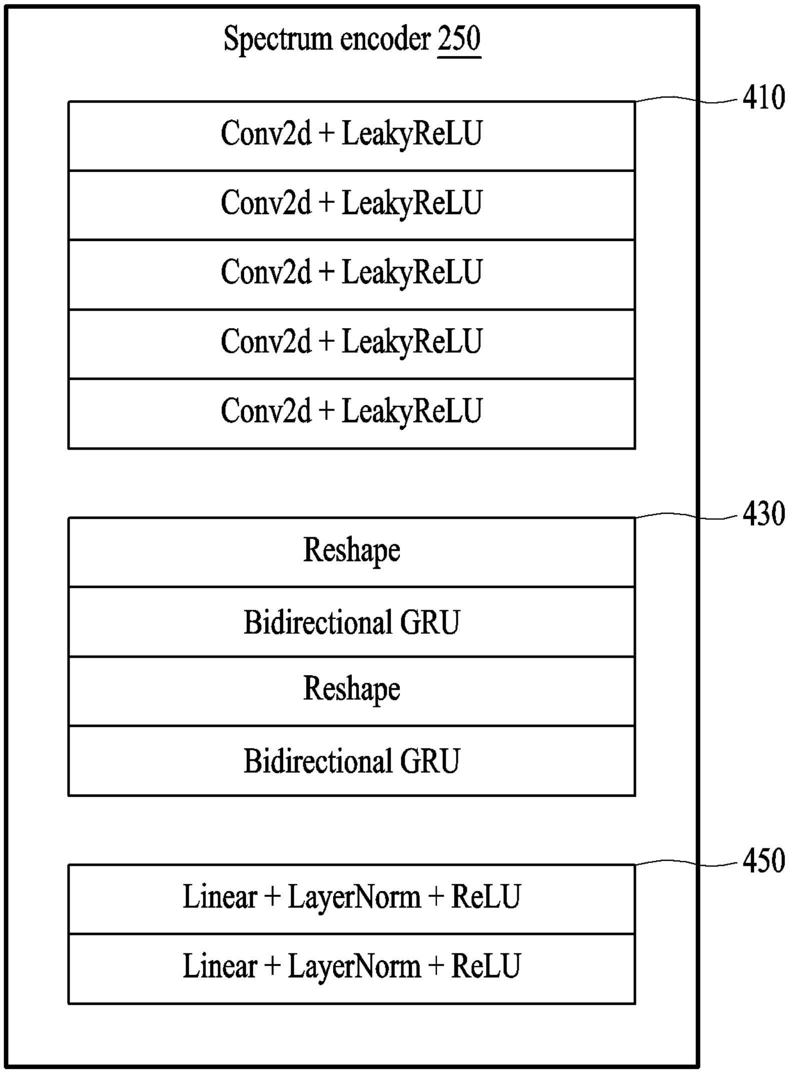
FIG. 4 illustrates an example of a spectrum encoder.
Figure 5:
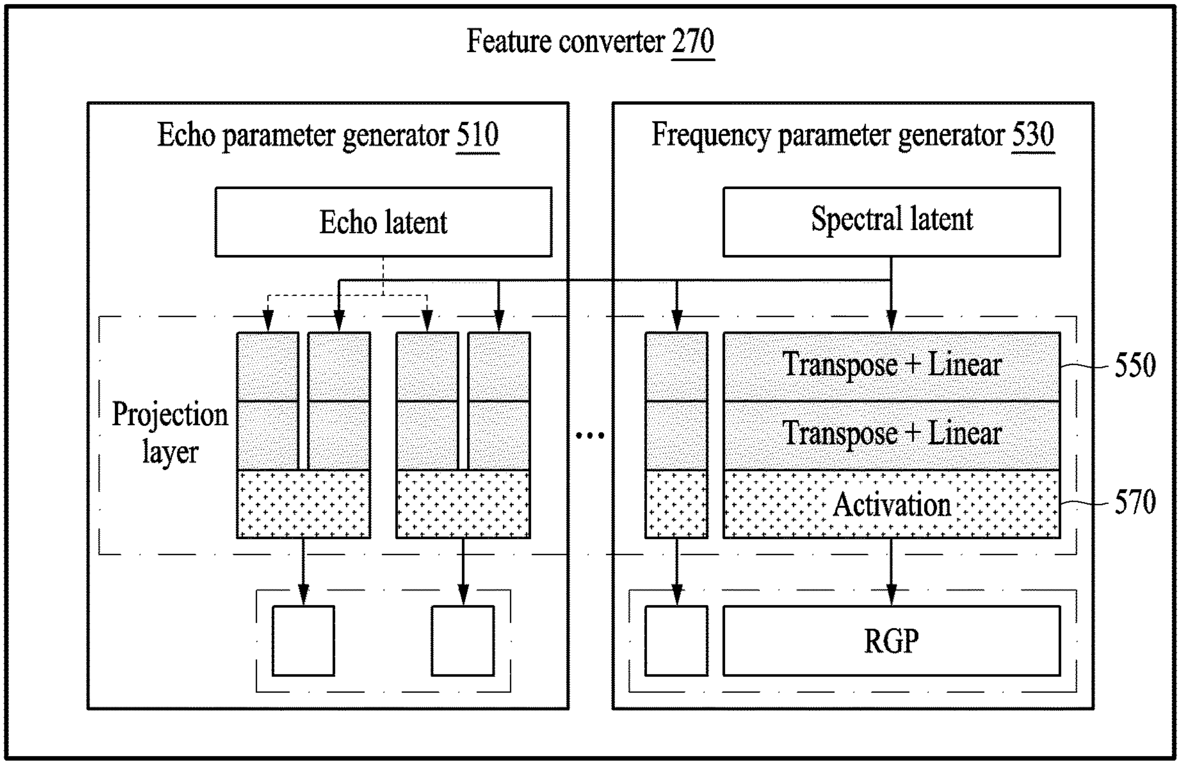
FIG. 5 illustrates an example of a feature converter.

FIG. 2 illustrates an example of an early response analyzer, FIG. 3 illustrates an example of a reflection encoder shown in FIG. 2, FIG. 4 illustrates an example of a spectrum encoder shown in FIG. 2, and FIG. 5 illustrates an example of a feature converter shown in FIG. 2.

Referring to FIGS. 2 to 5, the early response analyzer 130 may be configured as a deep neural network. The early response analyzer 130 may generate a reverberation parameter required to generate the late reverberation 170 based on the early room impulse response 110. The reverberation parameter may include an echo parameter 280 or a frequency parameter 290. The early response analyzer 130 may include an input converter 210, a reflection encoder 230, a spectrum encoder 250, and a feature converter 270.

The input converter 210 may convert the early room impulse response 110 into an echo histogram 211 for the early room impulse response 110. The input converter 210 may divide the early room impulse response 110 into a frame unit (e.g., a time frame unit) and then may construct a histogram for the pulse size of each frame to generate the echo histogram 211. For example, the echo histogram 211 may be expressed as a vector e with "J" elements per time frame when the pulse size of a frame is divided into "J" sections. For a total of "$L_0$" time frames, the echo histogram 211 may be expressed as a matrix of size ($L_0$, J) in the form of $E=[e_1, \ldots, e_{L0}]$.

The input converter 210 may convert the early room impulse response 110 into a spectrogram 212 for the early room impulse response 110. The input converter 210 may generate the spectrogram 212 through short-time Fourier transform (STFT). For example, when the spectrogram 212 has "$L_0$" time frames and "K" frequency bins, the spectrogram 212 may be expressed as "($L_0$, K)" matrices.

The reflection encoder 230 may generate an echo density feature vector 231 based on the echo histogram 211 and may output the echo density feature vector 231 to the feature converter 270. FIG. 3 illustrates an example of the reflection encoder 230. The reflection encoder 230 may include a plurality of layers (e.g., first, second, and third layers 310, 330, and 350. The first layer 310 may include a plurality of one-dimensional convolutional layers. The plurality of one-dimensional convolution layers may be sequentially connected to each other. The second layer 330 may include a reshape layer and a bidirectional gated recurrent unit. The third layer 350 may include a linear layer, a layer norm, and a rectified linear unit (ReLU) activation function. The reflection encoder 230 may extract an echo density change over time from the echo histogram 211 through the plurality of layers 310 to 350 and may output the echo density feature vector 231.

The spectrum encoder 250 may generate a frequency feature vector 251 based on the spectrogram 212 and may output the frequency feature vector 251 to the feature converter 270. FIG. 4 illustrates an example of the spectrum encoder 250. The spectrum encoder 250 may include a plurality of layers (e.g., fourth, fifth, and sixth layers 410, 430, and 450). The fourth layer 410 may include a plurality of two-dimensional convolutional layers. The plurality of two-dimensional convolutional layers may be sequentially connected to each other. The fifth layer 430 may include a plurality of reshape layers and a plurality of bidirectional gated recurrent units. The sixth layer 450 may include a linear layer, a layer norm, and an ReLU activation function. The spectrum encoder 250 may extract a frequency change over time from the spectrogram 212 through the plurality of layers 410 to 450 and may output the frequency feature vector 251.

The feature converter 270 may generate the echo parameter 280 based on the echo density feature vector 231 and the frequency parameter 290 based on the frequency feature vector 251. The feature converter 270 may output the echo parameter 280 and the frequency parameter 290 to the late reverberation generator 150. FIG. 5 illustrates an example of the feature converter 270. The feature converter 270 may include an echo parameter generator 510 and a frequency parameter generator 530. In addition, the echo parameter generator 510 and the frequency parameter generator 530 may each include a plurality of layers (e.g., a seventh layer 550 and an eighth layer 570). The seventh layer 550 may include a plurality of linear layers. The eighth layer 570 may include an activation function.

The echo parameter 280 may be used to individually control an echo of the late reverberation 170, and echo density of the late reverberation 170 may be controlled. The echo parameter 280 may have a different value for each time frame. In addition, the echo parameter 280 may include a first echo parameter (e.g., a first echo parameter 281 of FIG. 6) and a second echo parameter (e.g., a second echo parameter 282 of FIG. 6).

The frequency parameter 290 may be used to control time-frequency characteristics of the late reverberation 170. The frequency parameter 290 may have a different value for each time frame. In addition, the frequency parameter 290 may have as many parameters as the number of frequency sections. For example, when there are "K" frequency sections, the frequency parameter 290 may have "K" parameters.

Figure 6:
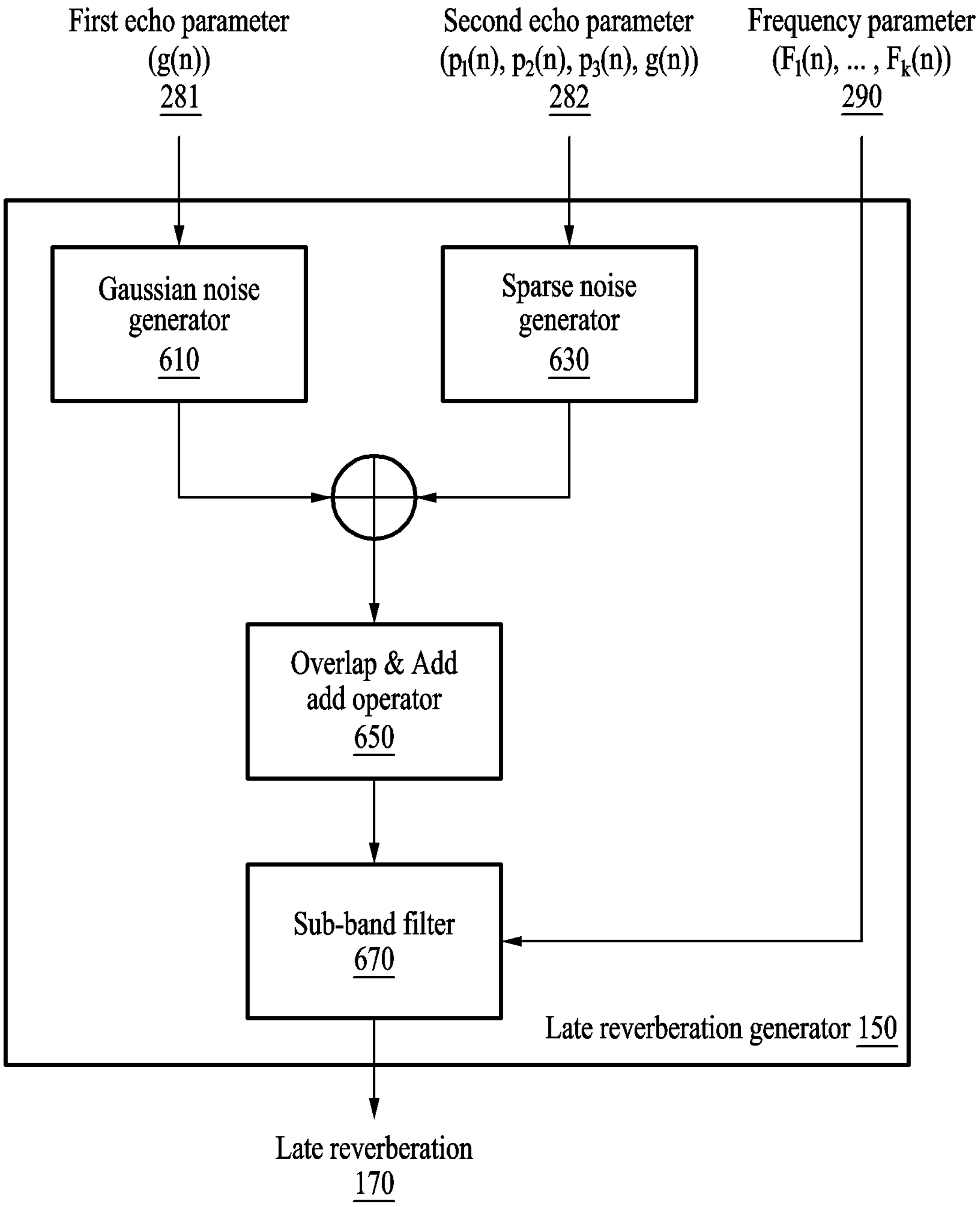
FIG. 6 illustrates an example of a late reverberation generator.

FIG. 6 illustrates an example of a late reverberation generator.

Referring to FIG. 6, the late reverberation generator 150 may be configured as an operator configured to perform a predetermined operation. The late reverberation generator 150 may generate the late reverberation 170 based on the echo parameter 280 (e.g., a first echo parameter 281 and a second echo parameter 282) and the frequency parameter 290 output from the early response analyzer 130. According to an embodiment, the late reverberation generator 150 may include a Gaussian noise generator 610, a sparse noise generator 630, an overlap & add operator 650, and a sub-band filter 670.

The Gaussian noise generator 610 may generate first noise based on the first echo parameter 281 and may output the first noise to the overlap & add operator 650. The first noise may include a signal in the form of random noise depending on time. The first echo parameter 281 may refer to the dispersion of the first noise. For example, the Gaussian noise generator 610 may set the first echo parameter 281 as the dispersion of the first noise to generate the first noise with a length of each time frame.

The sparse noise generator 630 may generate second noise based on the second echo parameter 282 and may output the second noise to the overlap & add operator 650. The sparse noise generator 630 may generate only a small number of pulses within one time frame to control echo density. The second echo parameter 282 may be a vector representing the sizes of a small number of pulses generated within one time frame. In addition, the sparse noise generator 630 may adjust the size of the pulses by multiplying each generated pulse by the second echo parameter 282. The second noise may include the pulses with the adjusted size. For example, when the sparse noise generator 630 generates "H" pulses within one time frame, each pulse may be multiplied by the "H" second echo parameters 282 to generate the second noise with the size of the pulse adjusted.

The overlap & add operator 650 may convert the first noise and the second noise into a signal in the form of reverberation and may output the signal in the form of reverberation to the sub-band filter 670. The overlap & add operator 650 may add the first noise to the second noise and may then synthesize the addition result signal for each time frame to convert the addition result signal into the signal in the form of reverberation.

The sub-band filter 670 may modulate a frequency of the signal in the form of reverberation converted through the overlap & add operator 650 based on the frequency parameter 290. The sub-band filter 670 may divide the signal in the form of reverberation into a plurality of sub-bands. The sub-band filter 670 may modulate the frequency of the signal in the form of reverberation by multiplying the frequency parameter 290 by the gain of the sub-bands for each time frame.

The late reverberation generator 150 may output the signal with the modulated frequency as the late reverberation 170.

The room impulse response generator 190 may generate the room impulse response 191 by concatenating the late reverberation 170 with the rear part of the early room impulse response 110.

Figure 7A:
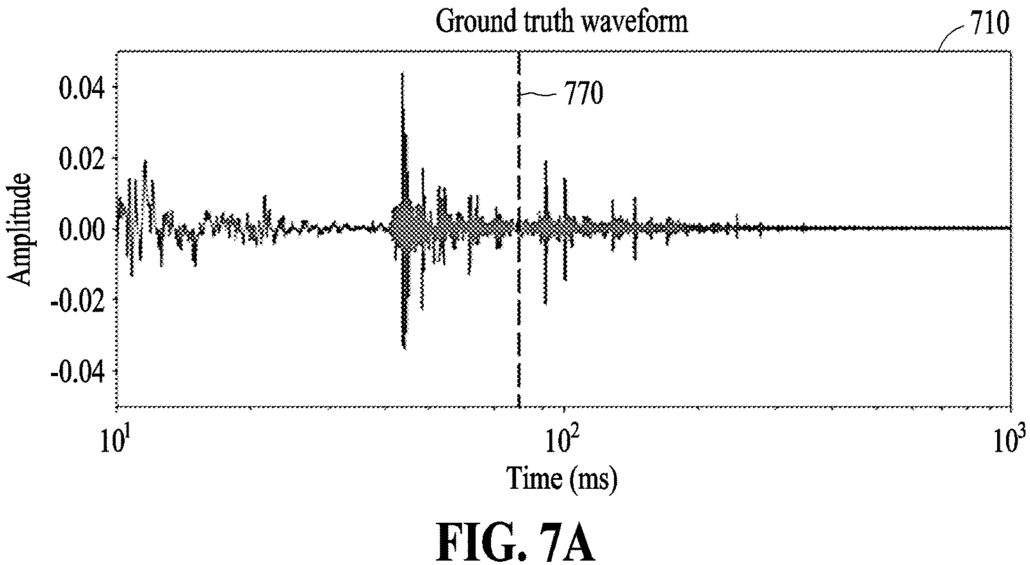
FIGS. 7A to 7C illustrate a room impulse response generated by a late reverberation generator trained according to an embodiment.
Figure 7B:
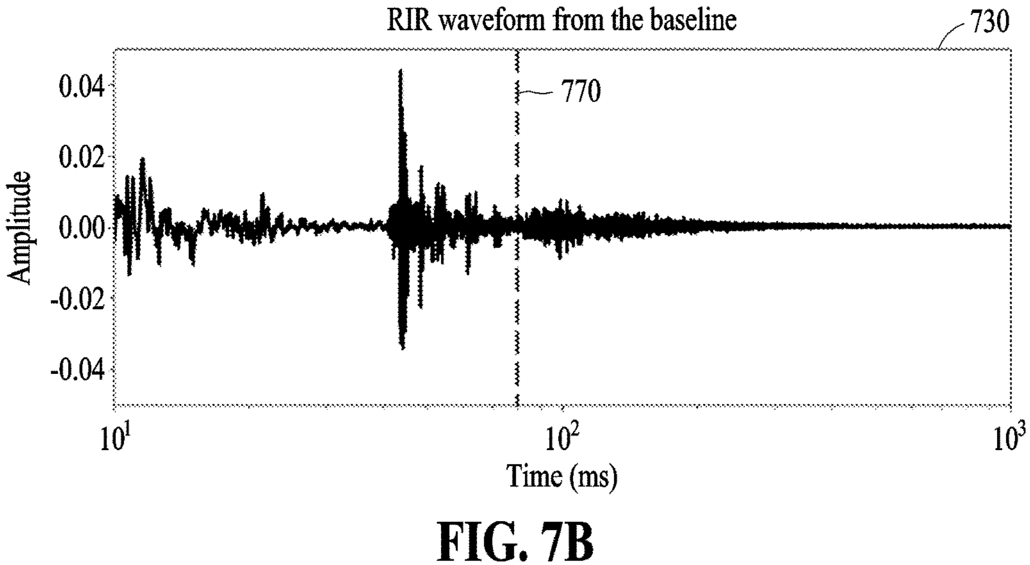
Figure 7C:
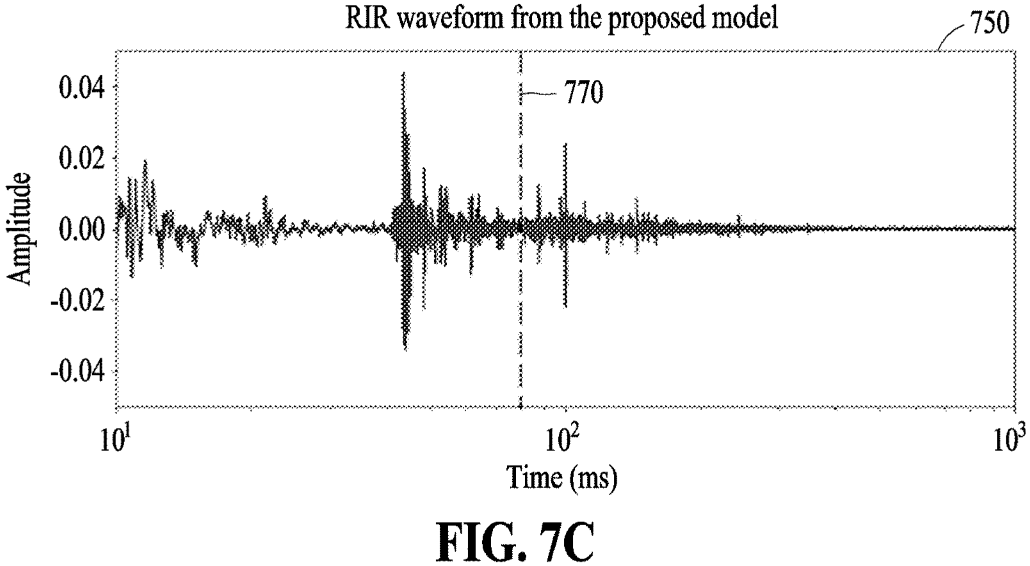

FIGS. 7A to 7C illustrate a room impulse response generated by a late reverberation generator trained according to an embodiment.

An area of the late reverberation 170 may be the area that appears behind a dashed line 770 shown in graphs 710 to 750. The graph 710 may represent an original room impulse response. The graph 730 may represent a room impulse response generated using only Gaussian noise. The graph 750 may represent a room impulse response generated by the late reverberation generation device 100.

In the area of the late reverberation 170, the room impulse response 191 generated by the late reverberation generation device 100 may be more similar to the original room impulse response than the room impulse response generated using only Gaussian noise.

Figure 8:
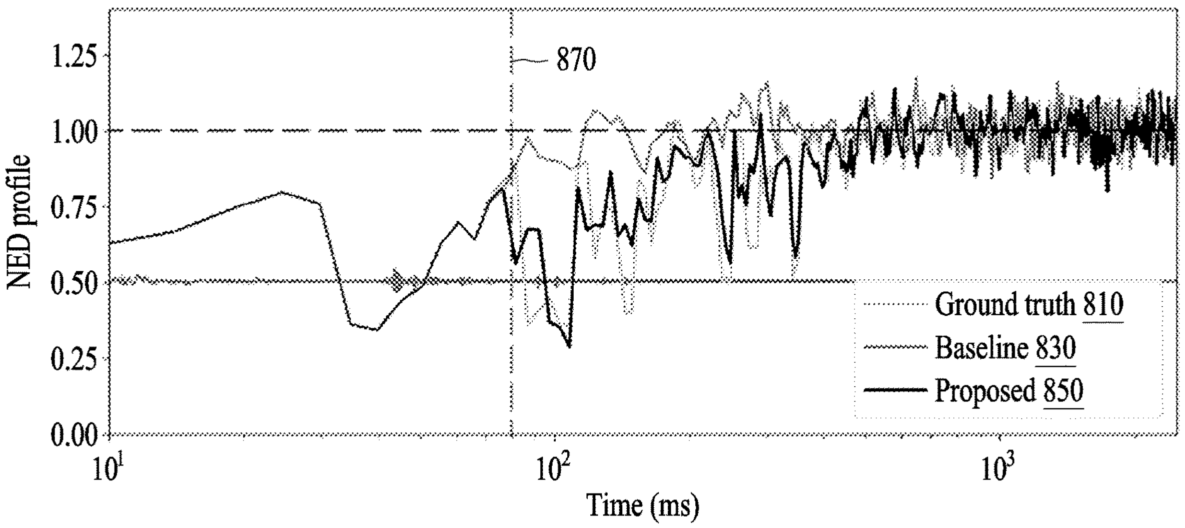
FIG. 8 illustrates an echo density profile over time, according to an embodiment.

FIG. 8 illustrates an echo density profile over time, according to an embodiment.

An area of the late reverberation 170 may be the area that appears behind a dashed line 870 shown in graphs 810 to 850. The graph 810 may represent an original room impulse response. The graph 830 may represent a room impulse response generated using only Gaussian noise. The graph 850 may represent a room impulse response generated by the late reverberation generation device 100.

In the area of the late reverberation 170, echo density of the room impulse response 191 generated by the late reverberation generation device 100 may be more similar to echo density of the original room impulse response than echo density of the room impulse response generated using only Gaussian noise.

Figure 9:
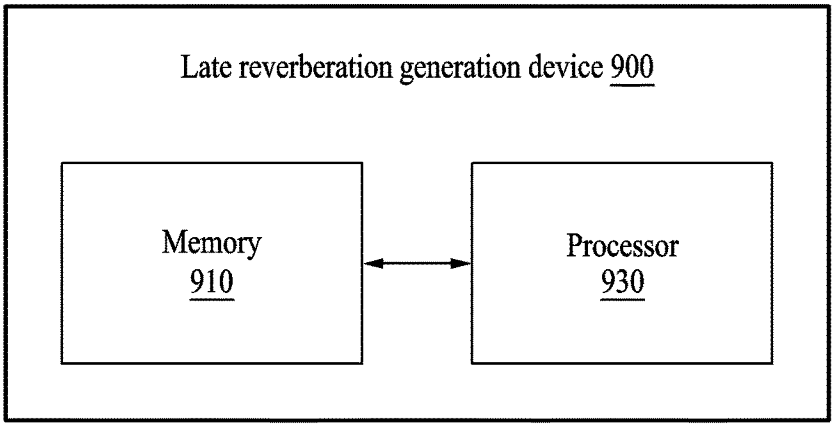
FIG. 9 illustrates an example of a late reverberation generation device according to an embodiment.

FIG. 9 illustrates an example of a late reverberation generation device according to an embodiment.

Referring to FIG. 9, a late reverberation generation device 900 may include a memory 910 and a processor 930. The late reverberation generation device 900 may be the late reverberation generation device 100 of FIG. 1.

The memory 910 may store instructions (e.g., programs) executable by the processor 930. For example, the instructions may include instructions for executing an operation of the processor 930 and/or instructions for executing an operation of each component of the processor 930.

The processor 930 may process data stored in the memory 910. The processor 930 may execute computer-readable code (e.g., software) stored in the memory 910 and instructions triggered by the processor 930.

The processor 930 may be a hardware-implemented data processing device having a circuit that is physically structured to execute desired operations. For example, the desired operations may include code or instructions included in a program.

For example, the hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The early response analyzer 130, the late reverberation generator 150, and the room impulse response generator 190 of FIG. 1 may be stored in the memory 910 and executed by the processor 930 or embedded in the processor 930. The processor 930 may perform the operation of the late reverberation generation device 100 described with reference to FIGS. 1 to 9 in substantially the same manner.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components, or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described embodiments, or vice versa.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

What is claimed is:

1. A sound processing method comprising:
generating a reverberation parameter required to generate late reverberation based on an early room impulse response;
outputting late reverberation based on the reverberation parameter; and
outputting a room impulse response based on the early room impulse response and the late reverberation,
wherein the generating of the reverberation parameter comprises generating the reverberation parameter based on an echo histogram and a spectrogram for the early room impulse response.

2. The sound processing method of claim 1, wherein:
the generating of the reverberation parameter based on the echo histogram and the spectrogram comprises:
generating an echo parameter based on the echo histogram; and
generating a frequency parameter based on the spectrogram,
wherein the reverberation parameter comprises the echo parameter and the frequency parameter.

3. The sound processing method of claim 2, wherein:
the generating of the echo parameter comprises:
generating an echo density feature vector based on the echo histogram; and
generating the echo parameter based on the echo density feature vector.

4. The sound processing method of claim 3, wherein:
the echo density feature vector is an echo density change over time extracted from the echo histogram.

5. The sound processing method of claim 2, wherein:
the generating of the frequency parameter comprises:
generating a frequency feature vector based on the spectrogram; and
generating the frequency parameter based on the frequency feature vector.

6. The sound processing method of claim 5, wherein:
the frequency feature vector is a frequency change over time extracted from the spectrogram.

7. The sound processing method of claim 2, wherein:
the outputting of the late reverberation comprises controlling characteristics of the late reverberation based on the echo parameter and the frequency parameter.

8. The sound processing method of claim 7, wherein:
the controlling of the characteristics of the late reverberation comprises:
controlling echo density of the late reverberation based on the echo parameter; and
controlling time-frequency characteristics of the late reverberation based on the frequency parameter.

9. The sound processing method of claim 8, wherein:
the outputting of the late reverberation comprises:
generating first noise based on a first echo parameter included in the echo parameter;
generating second noise based on a second echo parameter included in the echo parameter;
synthesizing the first noise with the second noise for each time frame to convert the first noise and the second noise into a signal in the form of reverberation;
modulating a frequency of the signal in the form of reverberation by a sub-band filter based on the frequency parameter; and
outputting the signal with the modulated frequency as the late reverberation.

10. A sound processing apparatus comprising:
a memory configured to store one or more instructions; and
a processor configured to execute the instructions,
wherein, when the instructions are executed, the processor is configured to perform a plurality of operations,
wherein the plurality of operations comprises:
generating a reverberation parameter required to generate late reverberation based on an early room impulse response;
outputting late reverberation based on the reverberation parameter; and
outputting a room impulse response based on the early room impulse response and the late reverberation,
wherein the generating of the reverberation parameter comprises generating the reverberation parameter based on an echo histogram and a spectrogram for the early room impulse response.

11. The sound processing apparatus of claim 10, wherein:

the generating of the reverberation parameter based on the echo histogram and the spectrogram comprises:

generating an echo parameter based on the echo histogram; and generating a frequency parameter based on the spectrogram, wherein the reverberation parameter comprises the echo parameter and the frequency parameter.

12. The sound processing apparatus of claim 11, wherein:

the generating of the echo parameter comprises:

generating an echo density feature vector based on the echo histogram; and generating the echo parameter based on the echo density feature vector.

13. The sound processing apparatus of claim 12, wherein:

the echo density feature vector is an echo density change over time extracted from the echo histogram.

14. The sound processing apparatus of claim 11, wherein:

the generating of the frequency parameter comprises:

generating a frequency feature vector based on the spectrogram; and generating the frequency parameter based on the frequency feature vector.

15. The sound processing apparatus of claim 14, wherein:

the frequency feature vector is a frequency change over time extracted from the spectrogram.

16. The sound processing apparatus of claim 11, wherein:

the outputting of the late reverberation comprises controlling characteristics of the late reverberation based on the echo parameter and the frequency parameter.

17. The sound processing apparatus of claim 16, wherein:

the controlling of the characteristics of the late reverberation comprises:

controlling echo density of the late reverberation based on the echo parameter; and controlling time-frequency characteristics of the late reverberation based on the frequency parameter.

18. The sound processing apparatus of claim 17, wherein:

the outputting of the late reverberation comprises:

generating first noise based on a first echo parameter included in the echo parameter;

generating second noise based on a second echo parameter included in the echo parameter;

synthesizing the first noise with the second noise for each time frame to convert the first noise and the second noise into a signal in the form of reverberation;

modulating a frequency of the signal in the form of reverberation by a sub-band filter based on the frequency parameter; and outputting the signal with the modulated frequency as the late reverberation.

* * * * *